United States Patent [19]

Boyer

[11] Patent Number: 4,739,727

[45] Date of Patent: Apr. 26, 1988

[54] ANIMAL WATERER

[76] Inventor: Robert W. Boyer, R.R. 2 - Box 554, Newton, Iowa 50208

[21] Appl. No.: 85,847

[22] Filed: Aug. 17, 1987

[51] Int. Cl.[4] ............................................. A01K 7/00
[52] U.S. Cl. ..................................................... 119/73
[58] Field of Search ..................... 119/61, 73, 72, 74, 119/75, 78, 51 R, 51.15; 49/99, 445, 447; 220/255

[56] References Cited

U.S. PATENT DOCUMENTS

| 1,054,482 | 3/1912 | Ahern | 119/51.15 |
| 2,512,839 | 6/1950 | Pruitt | 119/81 |
| 2,796,312 | 6/1957 | Townsend | 119/74 |
| 3,027,827 | 3/1962 | Nelson | 100/160 |
| 3,150,639 | 9/1964 | Sereda | 119/78 |
| 3,650,247 | 3/1972 | McKinstry | 119/81 |
| 3,745,977 | 7/1973 | Martin | 119/73 |
| 4,003,340 | 1/1977 | Kuzara et al. | 119/78 |
| 4,246,870 | 1/1981 | Gustin | 119/75 |
| 4,320,720 | 3/1982 | Streed | 119/73 |
| 4,559,905 | 12/1985 | Ahrens | 119/75 |
| 4,646,687 | 3/1987 | Peterson et al. | 119/73 |
| 4,656,970 | 4/1987 | Hostetler | 119/78 |

FOREIGN PATENT DOCUMENTS

| 537938 | 5/1950 | Canada | 119/72 |
| 968650 | 6/1975 | Canada | 119/73 |

OTHER PUBLICATIONS

Brochure-Mira Fount Thermal Livestock Waterers, MIRACO, A Division of Ahrens Agricultural Industries, Inc., Box 686, Grinnell, IA 50112.

Primary Examiner—Robert P. Swiatek
Assistant Examiner—R. Thomas Price
Attorney, Agent, or Firm—Henderson & Sturm

[57] ABSTRACT

An energy free animal waterer of a type having an insulated container for holding water, a supply conduit for supplying water under pressure to the container and a valve connected to the supply conduit for maintaining the water in the container substantially at a predetermined level. An insulated lid is sealingly attached to the top of the container and has a pair of openings therein each large enough to permit an animal to extend its mouth therethrough for the purpose of drinking water from the container. A first closure is disposed within the container below the lid for selectively sealingly closing the first opening and a second closure is disposed within the container, below the lid for selectively sealingly closing the second opening. A flexible length member extends between and is rotatably attached to the first and second closure members at each end of the length. Biasing structure, preferably a cable extending over a pulley and having a weight attached to one end thereof and the other end attached to an intermediate part of the link member, holds the closure members against the bottom of the first and second openings to keep them closed except when an animal is pushing them down to drink from the container.

8 Claims, 3 Drawing Sheets

U.S. Patent    Apr. 26, 1988    Sheet 1 of 3    4,739,727
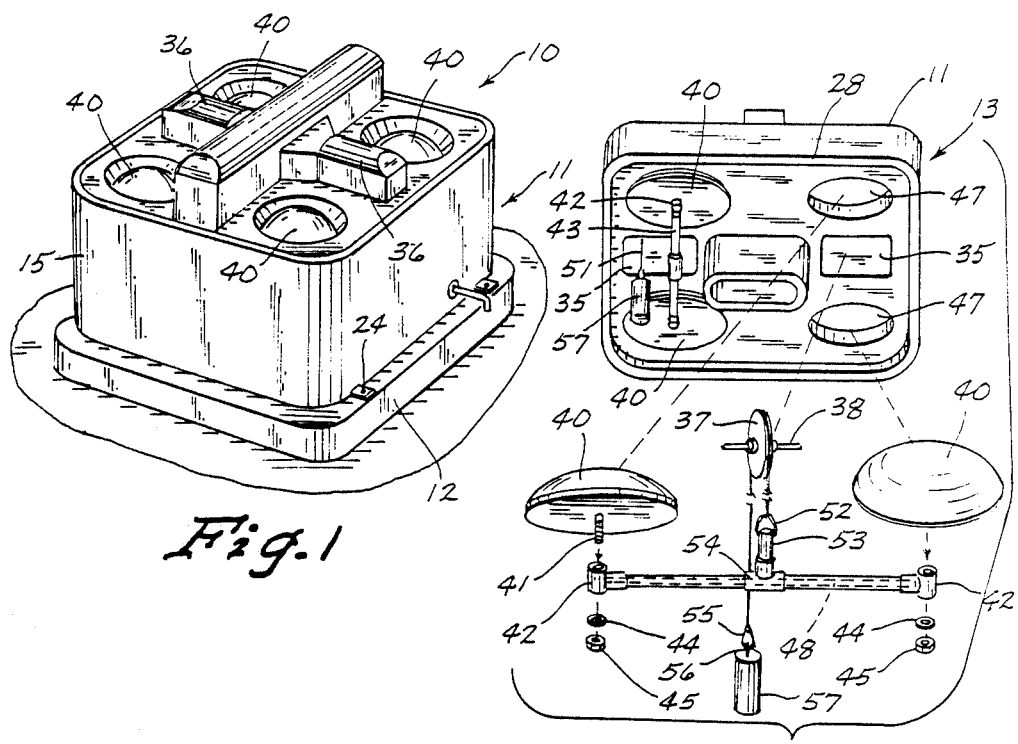
Fig. 1
Fig. 2
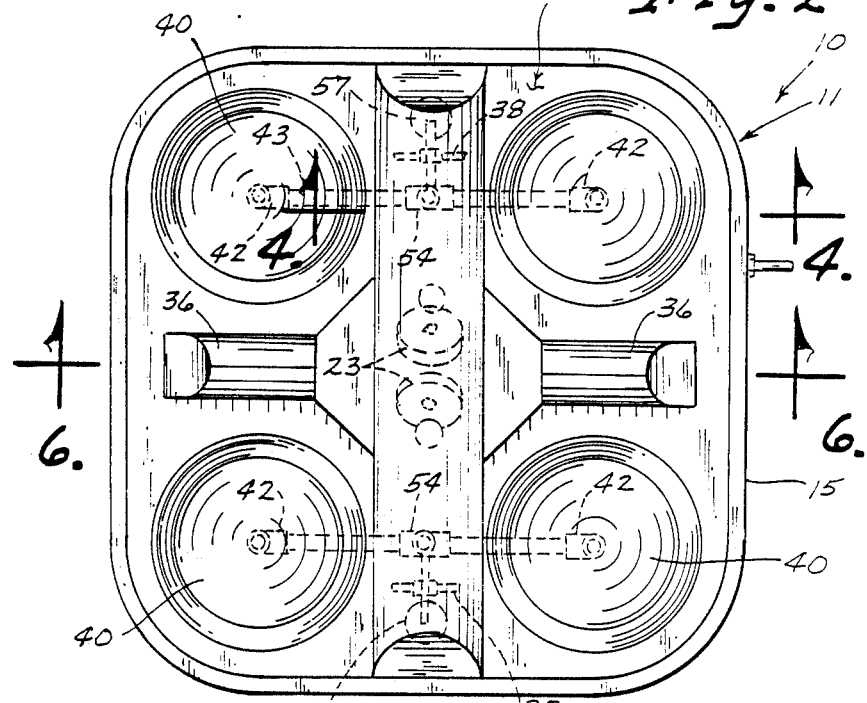
Fig. 3

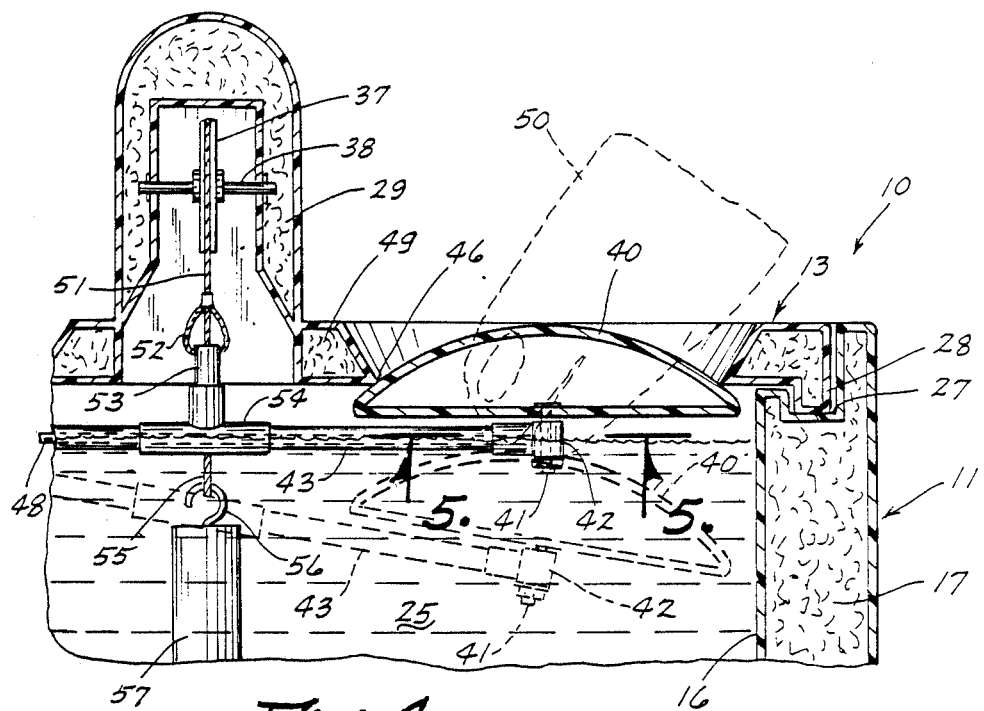
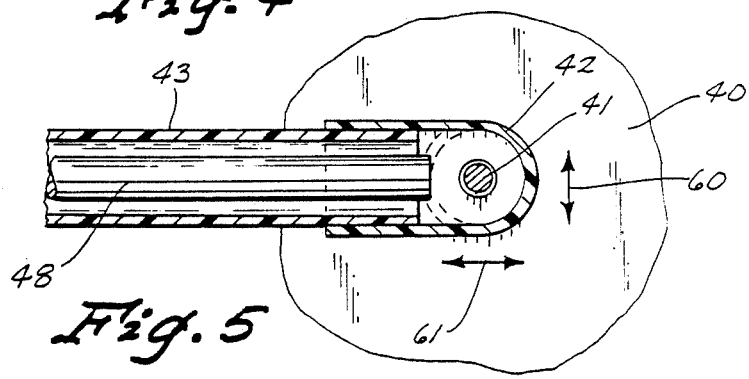

ANIMAL WATERER

TECHNICAL FIELD

The present invention relates generally to livestock waterers, and more particularly to a non-heated, non-freezing type animal waterer sometimes referred to as an energy free waterer.

BACKGROUND ART

In order to provide livestock, such as cattle or hogs, with water in sub-freezing temperatures, tank heaters and heated waterers have been developed. An obvious drawback to such a system is the energy cost for fuel to be burned or electricity to be used. Because of the major cost of energy for heating such systems, non-heated types of waterers have been developed.

This latter category of waterer is of a type as shown in U.S. Pat. Nos. 3,745,977 to Martin and 4,559,905 to Ahrens. The latter category of waterer uses a floating ball or floating closure in order to prevent outside air from entering a container of water except during that time that livestock is drinking therefrom. For example, in U.S. Pat. No. 4,559,905, an animal would put its mouth against the ball and push the ball downwardly so as to have access to the water within the container in which the ball is floating.

One of the problems with a floating ball embodiment is that at least in some commercial embodiments thereof the water level is maintained so low that it is difficult for an animal to stick its mouth that far down through the opening which the ball normally closes. This causes slower utilization of the water and perhaps the need for more waterers to accommodate large numbers of livestock.

Another problem with the ball type waterers which utilize multiple balls in the same unit is that when one animal is drinking from one opening, and pushing the ball to one side, it is sometimes interferred with by another animal drinking from an adjacent hole and pushing the floating ball thereof toward the first stated ball. In other words, both floating ball closures can sometimes not be completely pushed open without abutment with one another. It would of course, be easy to remedy this situation by making the waterer larger, but that would only increase the production and maintenance costs thereof.

Still another problem with a floating ball-type waterer arises in a situation when the inlet water quits flowing, such as in a power outage when the supply pump stops. In such event, the animals will continue to drink until the water is gone, but since no more water is supplied, the floating balls drop. This causes the waterer to freeze up because of outside air continuously entering the housing.

DISCLOSURE OF THE INVENTION

The present invention relates to an energy free animal waterer of a type having an insulated container for holding water, a supply conduit for supplying water under pressure to the container and a valve connected to the supply conduit for maintaining the water in the container substantially at a predetermined level. An insulated lid is sealingly attached to the top of the container and has a pair of openings therein each large enough to permit an animal to extend its mouth therethrough for the purpose of drinking water from the container. A first closure is disposed within the container below the lid for selectively sealingly closing the first opening and a second closure is disposed within the container, below the lid for selectively sealingly closing the second opening. A flexible link member extends between and is rotatably attached to the first and second closure members at each end of the link. Biasing structure, preferably a cable extending over a pulley and having a weight attached to one end thereof and the other end attached to an intermediate part of the link member, holds the closure members against the bottom of the first and second openings to keep them closed except when an animal is pushing them down to drink from the container.

An object of the present invention is to provide an improved animal waterer.

Another object of the present invention is to provide an improved energy free animal waterer.

Another object is to provide cool, clean, algae-free water in the summertime.

A further object of the present invention is to provide an energy free animal water which does not depend on floating closures, but instead has a positive biasing system.

A still further object of the present invention is to provide a waterer of the aforementioned type which utilizes a weight biased closure system.

A still further object of the present invention is to provide a waterer of the aforementioned type which is capable of maintaining the water level within the container closer to the openings through which the livestock need to extend their mouths in order to drink therefrom.

A still further object of the present invention is to provide a waterer having multiple access openings for animals of a type wherein all of such openings can be utilized at one time without interference of the closure members due to pushing thereon by livestock using the other access openings.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a livestock waterer constructed in accordance with the present invention;

FIG. 2 is an exploded perspective of the lid of the livestock waterer showing also the closure structures and the closure biasing structure which is attached to the lid;

FIG. 3 is a top plan view of the livestock waterer shown in FIG. 1;

FIG. 4 is an enlarged partial cross sectional view taken along line 4—4 of FIG. 3;

FIG. 5 is an enlarged partial cross sectional view taken along line 5—5 of FIG. 4;

BEST MODE FOR CARRYING OUT THE INVENTION

Figure 6:
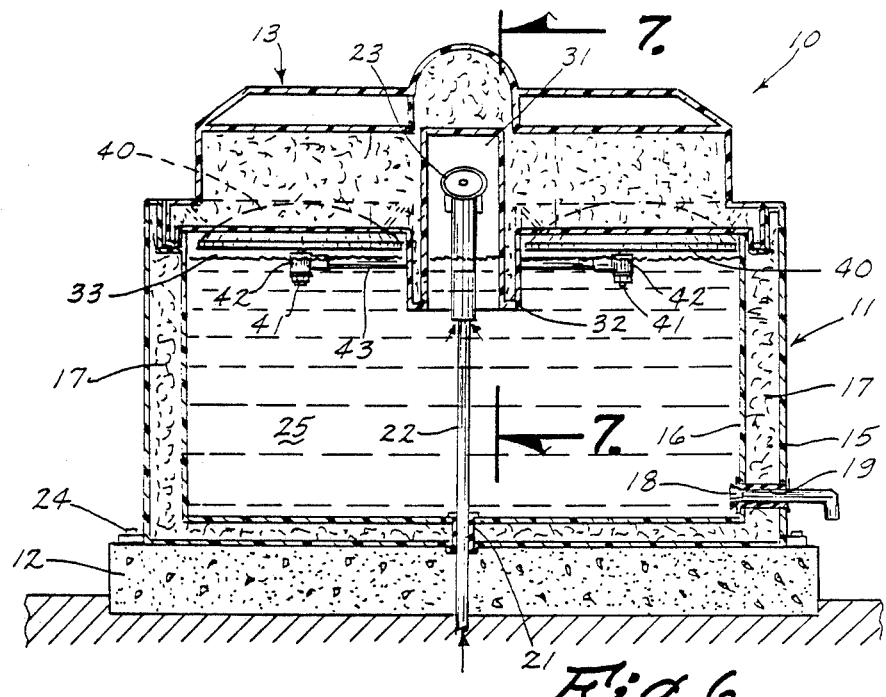
FIG. 6 is a cross sectional view taken along line 6—6 of FIG. 3.

Referring now to the drawings, wherein like reference numerals designate identical or corresponding parts throughout the several views, FIG. 1 shows a livestock waterer (10) constructed in accordance with the present invention. The livestock waterer (10) includes a container (11) bolted to a concrete slab (12) and having a lid (13) for closing the top of the container (11). Referring to FIG. 6, it is noted that the container (11) including an outer wall (15) and an inner wall (16) which can be molded, for example of polyethylene although other materials are certainly adequate, and a urethane foam (17) filling all of the voids between the walls (15 and 16) for insulating purposes. A plug (18) is provided for selectively closing a drain opening (19) at the bottom of the container (11). A pair of inlet openings (21) are provided for permitting inlet supply pipes (22) to direct water under pressure to valves (23). Two inlet pipes (22) and two water level control valves (23) are utilized to double the recovery rate of the water (25) within the container so that the animals can drink more quickly therefrom and thereby decrease the need for more animal waterers when a large number of animals are to be serviced by such waterer (10).

Referring to FIG. 4, it is noted that the top of the container (11) has a depression (27) therein for receiving a continuous projection (28) from the lid (13).

The lid (13) is also molded from polyethelene and is filled with urethane foam (29), although it is to be understood that other materials can be utilized to form such lid. Referring to FIGS. 2 and 6, it is noted that a valve receiving chamber (31) is formed by downwardly extending projection (32) which extends below the water line (33). This causes the chamber (31) to always be sealed thereby preventing freezing of the valves (23).

Figure 7:
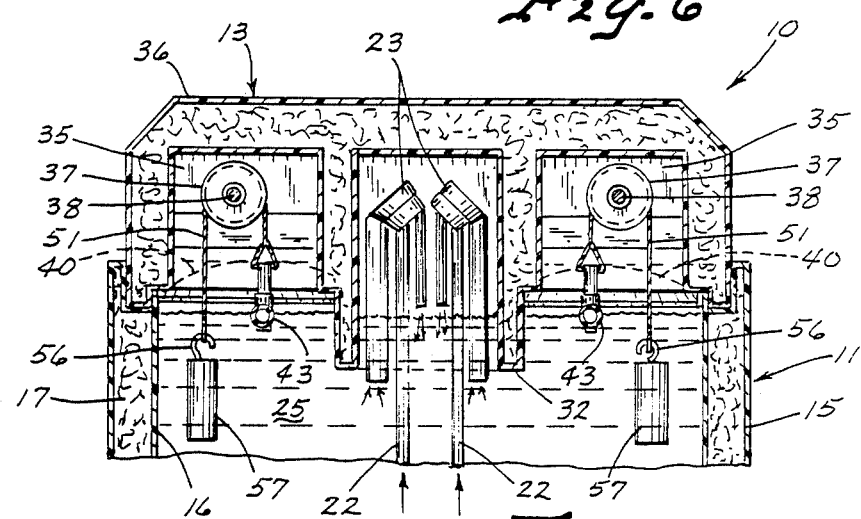
FIG. 7 is a cross sectional view taken along line 7—7 of FIG. 6.

Referring to FIGS. 1, 2, and 7, it is noted that chambers (35) are formed by the walls (36) for mounting pulleys (37) rotatably to the walls (36) by an axle (38).

Referring to FIG. 2, it is noted that plastic molded closures (40), which may be constructed of polyethylene, for example, have a threaded bolt (41) extending downwardly therefrom to extend through an opening in a tube (42) in link member (43). A washer (44) and threaded nut (45) hold the closure member (40) to the end of the link member (43), but it is to be understood that the closure member (40) can rotate about the axis of the bolt (41) to permit positive seating against the bottom (46) of the openings (47) in the lid (13). It will be noted in FIG. 4 that the openings (47) taper from a top portion (49) inwardly to the bottom portion (46) thereof for providing easier access for an animal (50) as shown in dashed lines in FIG. 4.

Referring to FIG. 5, it is noted that the link member (43) can be formed of plastic pipe which is somewhat flexible having connectors (42) glued to the ends thereof and having a somewhat flexible thin rod (48) extending therethrough. The flexibleness of the link (43) and rod (48) become important if it happens that livestock have not been using the waterer for several days during sub-zero weather and one of the closure members (40) needs to be pushed downward to break ice therefrom. Obviously, one of the closure members (40) can be pushed downwardly, while the other one is frozen shut as long as the link member (43) and rod (48) are somewhat flexible.

Referring again to FIGS. 2 and 4, it is noted that pulley (37) has a flexible cable (51) extending over the top thereof. The cable (51) is connected to the link member (43) by a loop (52) extending through a member (53) attached to a member (54) which extends around central portion of the link member (43). The other end of the cable (51) has a loop (55) hooked to a hook (56) on a heavy metal weight (57).

In operation, the waterer (10) would be installed on a slab (12) by brackets (24) to a concrete slab (12), and water pressure would be supplied to the inlet pipes (22). The valves (23), which are of a type manufactured by Fillpro Products of Carlsbad, Calif., will allow the water level to fill to the level (33) as shown in FIG. 6, at which time the flow will stop until the water level lowers, at which time the valves (23) will open and cause the level to return to such preset level.

It is noted that before the lid (13) is placed on top of the container (11), that the depression (27) around the periphery of the container (11) is filled with water. Then when the projection (28) as shown in FIG. 4 is placed therein, water will form a seal between the projection and the depression and, in freezing weather this seal will be formed of ice as contemplated by this invention to form a very good permanent seal.

Whenever an animal, such as animal (50) as shown in FIG. 4 desires to drink from the waterer (10), the animal merely pushes its mouth down against the closure member (40), pushing it from the position shown in solid lines in FIG. 4 to the position shown in dashed lines in FIG. 4 to drink from the container (11).

Referring to FIG. 5, it is noted that the closure member can also be pushed back and forth in the direction of the arrows (60 and 61) as well as just being pushed down. Consequently, rather than the closure member (40) being directly under the mouth of the animal (50), it might be held to one side of the animal's head as it holds its mouth down into the water (25).

As will readily be apparent to those skilled in this art, from viewing the drawings, four animals can drink from the waterer (10) all at the same time in the same fashion as just described above.

Accordingly, it will be appreciated that the preferred embodiment dislcosed herein does indeed accomplish the aforementioned objects. Obviously, many modifications and variations of the present invention are possible in light of the above teachings. For example, while the preferred embodiment shown in FIG. 1 is designed for cattle or horses, other models utilizing the invention could be lower and have the top thereof slanted in one direction or the other for accommodating hogs or other smaller animals. It is therefore to be understood that, within the scope of the appended claims, the invention may be practised otherwise than as specifically described.

I claim:
1. An animal waterer comprising:
   an insulated container for holding water, said container having an open top;
   a supply conduit means for supplying water under pressure to said container;
   valve means connected to said supply conduit means for maintaining the water in said container substantially at a predetermined level;
   an insulated lid for sealingly closing said open top of the container;
   a first and a second opening in said lid large enough to permit an animal to extend its mouth therethrough for the purpose of drinking from said container;
   a first closure means disposed within said container below said lid for selectively sealingly closing said first opening;

a second closure means disposed within said container below said lid for selectively sealingly closing said second opening;

a link member;

means for attaching said first closure means to one end of said link member;

means for attaching said second closure means to the other end of said link member; and means operably attached to said link member and said lid for biasing said link member and thereby said first and second closure means toward said first and second openings in the lid whereby said first and second openings will be closed by said first and second closure means at all times except when said first or second closure means are pushed downwardly by livestock drinking from said container.

2. The animal waterer of claim 1 including a continuous depression around the top edge of said container, said lid having a continuous projection means for extending into said continuous depression, said projection means being slightly smaller than said depression whereby water disposed in a space between the depression and projection will collect and freeze in the wintertime, thereby forming a seal to prevent cold air from entering said container around the top thereof.

3. The animal waterer of claim 1 wherein said biasing means comprises a pulley rotatably attached to said lid and a flexible line member attached at one end thereof to said link member and at the other end thereof to a weight, said flexible line extending over and around a top portion of said pulley.

4. The animal waterer of claim 3 wherein said biasing means is attached near the center of said link member.

5. The animal waterer of claim 4 wherein said link member is flexible.

6. The animal waterer of claim 5 wherein said first and second closure members are partially spherically shaped on a top portion thereof and said first and second openings are circular at the bottom thereof and slightly smaller than the respective first and second closure means whereby exact alignment of the respective closure means with the respective opening is not necessary to achieve a good seal therebetween.

7. The animal waterer of claim 6 wherein said first and second closure means are rotatably attached to said link member.

8. The animal waterer of claim 1 wherein said container and lid are formed of polyethelene and filled with urethane foam.

* * * * *